(12) United States Patent
Kim

(10) Patent No.: US 7,923,958 B2
(45) Date of Patent: Apr. 12, 2011

(54) APPARATUS AND METHOD FOR DRIVING 2-PHASE SRM MOTOR

(75) Inventor: Sang-Young Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 463 days.

(21) Appl. No.: 12/088,736

(22) PCT Filed: Oct. 25, 2006

(86) PCT No.: PCT/KR2006/004365
§ 371 (c)(1),
(2), (4) Date: Mar. 31, 2008

(87) PCT Pub. No.: WO2008/050918
PCT Pub. Date: May 2, 2008

(65) Prior Publication Data
US 2010/0156337 A1    Jun. 24, 2010

(51) Int. Cl.
*H02P 25/08*   (2006.01)
*H02P 6/20*    (2006.01)

(52) U.S. Cl. .................................... 318/701; 318/254.1

(58) Field of Classification Search ................ 318/430, 318/431, 700, 701, 254.1, 254.2
See application file for complete search history.

(56) References Cited

U.S. PATENT DOCUMENTS

| | | | |
|---|---|---|---|
| 5,446,359 A | 8/1995 | Horst | |
| 5,747,962 A * | 5/1998 | Fulton | ........................ 318/701 |
| 5,821,723 A | 10/1998 | Kim | |
| 6,700,348 B2 * | 3/2004 | Lim | ........................ 318/778 |
| 6,803,740 B2 | 10/2004 | Mir et al. | |
| 2004/0036440 A1 | 2/2004 | Kim et al. | |
| 2004/0061464 A1 | 4/2004 | Kim et al. | |
| 2004/0061472 A1 | 4/2004 | Won et al. | |
| 2006/0284512 A1 | 12/2006 | Lee et al. | |
| 2007/0120434 A1 | 5/2007 | Oh et al. | |
| 2007/0257633 A1 | 11/2007 | Won et al. | |

FOREIGN PATENT DOCUMENTS

| | | |
|---|---|---|
| CN | 1412931 | 4/2003 |
| CN | 1797933 | 7/2006 |

OTHER PUBLICATIONS

Chinese Office Action dated Sep. 27, 2010 (Application No. 200680044544.1).

* cited by examiner

*Primary Examiner* — Bentsu Ro
(74) *Attorney, Agent, or Firm* — KED & Associates LLP

(57) ABSTRACT

An apparatus and method for driving a 2-phase SRM are provided. The method may include initializing 2-phase SRM based on a detected position of a rotor by an initializing sensor at a time of an initial driving, and normally driving the 2-phase SRM based on a detected position of the rotor by a driving sensor. With this method, a sufficient amount of torque is generated when the 2-phase SRM is driven at a high speed. The apparatus may include an initializing sensor that detects each position of each phase of a 2-phase SRM, and generates an initializing sensor signal based on the detected result; a driving sensor that detects each position of each phase of the 2-phase SRM, and generates a driving sensor signal based on the detected result; and a microprocessor that initially drives the 2-phase SRM based on the initializing sensor signal at the time of an initial driving, and normally drives the 2-phase SRM based on the driving sensor signal at the time of a normal driving.

20 Claims, 7 Drawing Sheets

APPARATUS AND METHOD FOR DRIVING 2-PHASE SRM MOTOR

TECHNICAL FIELD

The present invention relates to a 2-phase SRM (switched reluctance motor), and more particularly, to an apparatus and method for driving a 2-phase SRM by individually using an initializing sensor for an initial driving and a driving sensor for a normal driving.

BACKGROUND ART

In the conventional method for driving a 2-phase SRM, two position sensors are used to detect each position of a rotor, and generated sensor signals serve to initialize and drive each phase.

FIG. 1 is a view schematically showing a construction for detecting a sensor signal of a 2-phase SRM. As shown, the 2-phase SRM comprises a 4-pole stator 10, a 2-phase rotor 11, a rotor shaft 12 connected to the center of the rotor 11 for transmitting a rotary motion of the rotor, a 2-phase shutter 13 rotatably connected to the rotor shaft 12, 1-phase and 2-phase sensors 14a and 14b for detecting a position of the shutter 13, and a sensor signal generator 15 for generating 1-phase and 2-phase sensor signals from signals detected by the 1-phase and 2-phase sensors 14a and 14b.

Each phase of the shutter 13 has an angle of 120°, and the two phases form an angle of 60° therebetween.

The 1-phase and 2-phase sensors 14a and 14b form an angle of 90° therebetween, and are positioned on the shutter 13.

In the conventional method for driving an SRM, when the shutter 13 is rotated as the rotor 11 is rotated, the sensors 14a and 14b detect each position of each phase of the shutter 13. Then, the sensors 14a and 14b transmit the detected position to the sensor signal generator 15 thus to enable 1-phase and 2-phase sensor signals to be generated.

That is, the 1-phase and 2-phase sensors respectively detect each position of each phase of the rotor, and then a microprocessor (not shown) generates 1-phase and 2-phase signals corresponding to the sensor signals. Accordingly, a current is supplied to each winding of each phase of the SRM thus to generate a torque.

FIGS. 2 to 5 show sensor signals according to each position of a rotor of the 2-phase SRM in accordance with the conventional art.

As shown, when the rotor 11 is counterclockwise rotated, the shutter 13 connected to the rotor shaft 12 starts to be rotated. The 1-phase and 2-phase sensors 14a and 14b detect a position of the shutter 13 thus to detect a position of the rotor 11. Accordingly, the sensor signal generator 15 generates a sensor signal of each phase.

Referring to FIGS. 2 to 5, when the rotor 11 is aligned, the shutter 13 is positioned at an angle of 0°.

FIG. 2 shows a high 1-phase sensor signal S1 and a high 2-phase sensor signal S2 when the shutter 13 is positioned within a range of 0°~30°.

FIG. 3 shows a high 1-phase sensor signal S1 and a low 2-phase sensor signal S2 when the shutter 13 is positioned within a range of 30°~90°.

FIG. 4 shows a high 1-phase sensor signal S1 and a high 2-phase sensor signal S2 when the shutter 13 is positioned within a range of 90°~120°.

FIG. 5 shows a low 1-phase sensor signal S1 and a high 2-phase sensor signal S2 when the shutter 13 is positioned within a range of 120°~180°.

A microprocessor (not shown) generates each sensor signal of each phase and modulates each pulse width of the generated signals, thereby driving the SRM.

FIG. 6 is a curve showing an SRM driving torque in accordance with the conventional art.

As shown, a 1-phase signal having a dwell time of 0°~120° and 180°~300° of one cycle of 360°, and a 2-phase signal having a delay of 90° from the 1-phase signal are modulated from the first and second sensor signals shown in FIGS. 2 to 5 thus to be input to each winding of the 2-phase SRM. Accordingly, a torque is generated as shown by the curve of FIG. 6.

However, the conventional art has the following problems. Since the 1-phase sensor initializes and normally-drives a 1-phase and the 2-phase sensor initializes and normally-drives a 2-phase, a sufficient amount of current is not supplied to each winding of each phase of the SRM at the time of an initial torque occurrence in a normal driving mode (e.g., t1, t2 and t3 of FIG. 6). Accordingly, a torque is not sufficiently generated thus not to normally drive the SRM.

That is, when the 2-phase SRM is driven at a high speed, each phase signal has to be risen at a point prior to an initial point so as to generate a sufficient amount of torque. However, in the conventional art, the 1-phase sensor and the 2-phase sensor detect sensor signals at the same position in an initial driving mode and a normal driving mode, thereby generating each phase signal and a signal for driving the SRM. Accordingly, a sufficient amount of torque is not generated at the time of driving the SRM at a high speed.

DISCLOSURE OF THE INVENTION

Therefore, it is an object of the present invention to provide an apparatus and method for driving a 2-phase SRM capable of individually performing an initial driving by an initializing sensor and a normal driving by a driving sensor.

To achieve these objects, there is provided an apparatus for driving a 2-phase SRM (switched reluctance motor), comprising: an initializing sensor which detects each position of each phase of a 2-phase SRM, and generates an initializing sensor signal based on the detected result; a driving sensor which detects each position of each phase of the 2-phase SRM, and generates a driving sensor signal based on the detected result; and a microprocessor which initially drives the 2-phase SRM based on the initializing sensor signal at the time of an initial driving, and normally drives the 2-phase SRM based on the driving sensor signal at the time of a normal driving.

MODES FOR CARRYING OUT THE PREFERRED EMBODIMENTS

Figure 1:
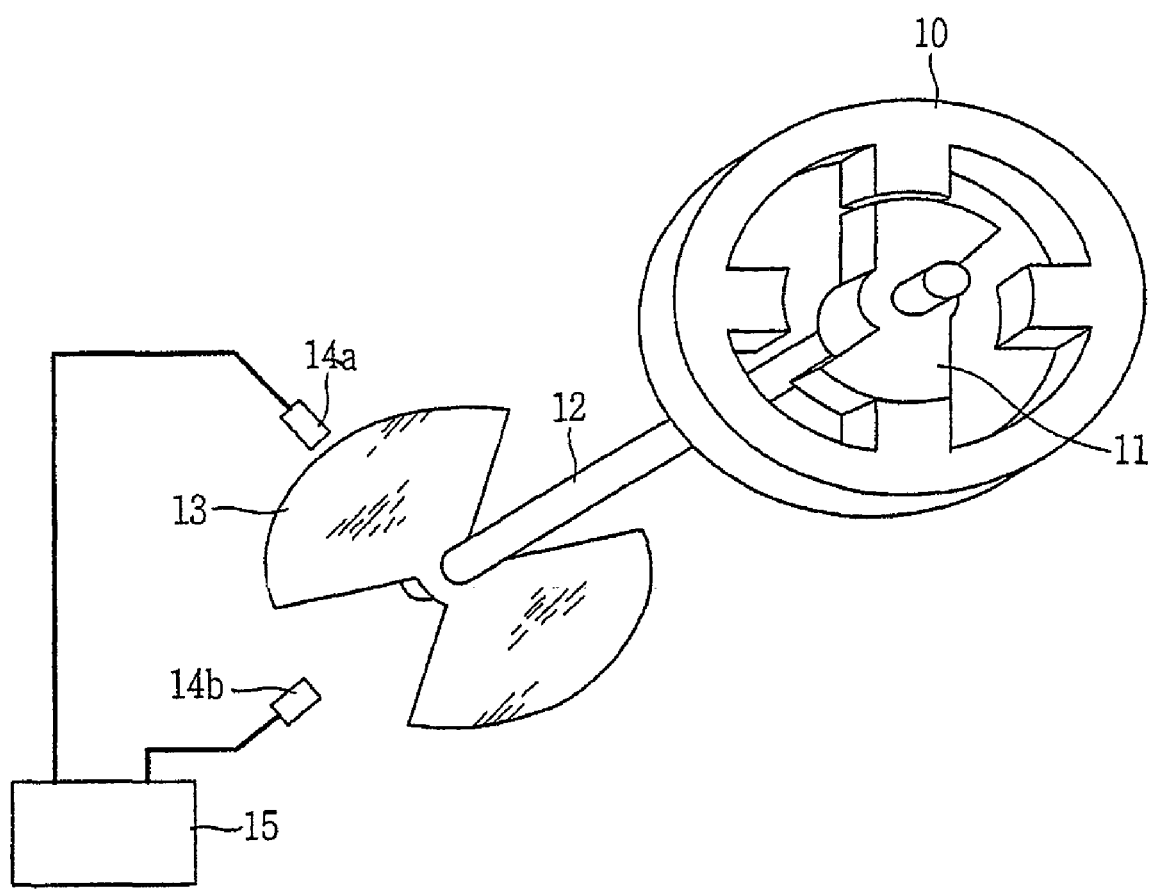
FIG. 1 is a configuration view schematically showing a 2-phase SRM for detecting each sensor signal.
Figure 2:
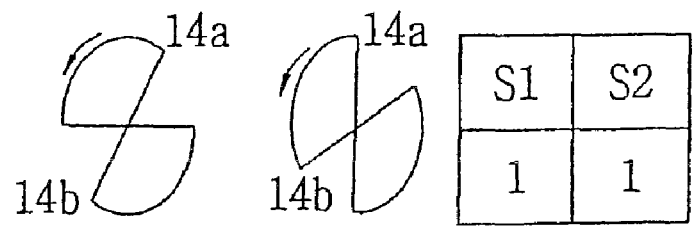
FIGS. 2 to 5 are views showing sensor signals according to each position of a rotor of the 2-phase SRM.
Figure 3:
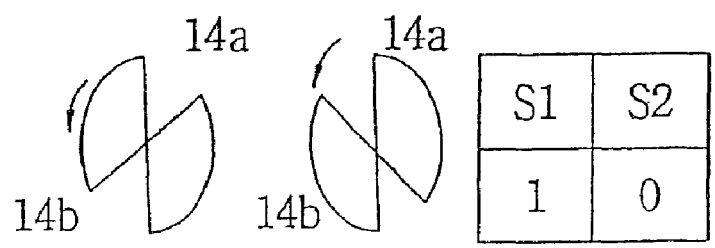
Figure 4:
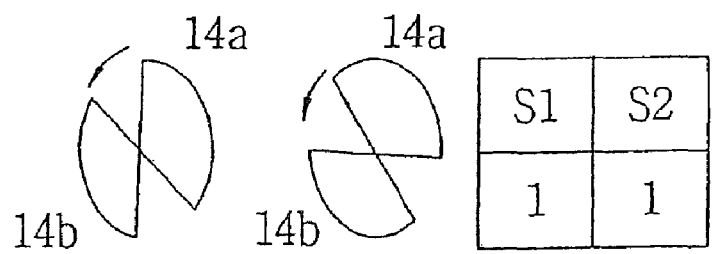
Figure 5:
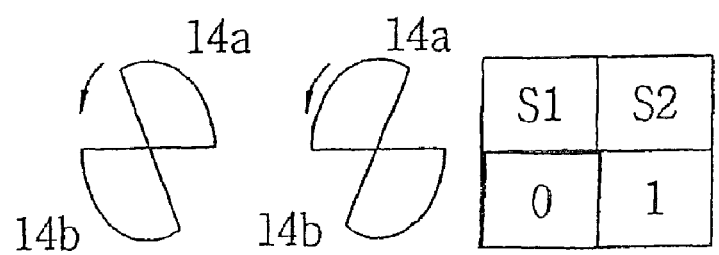
Figure 6:
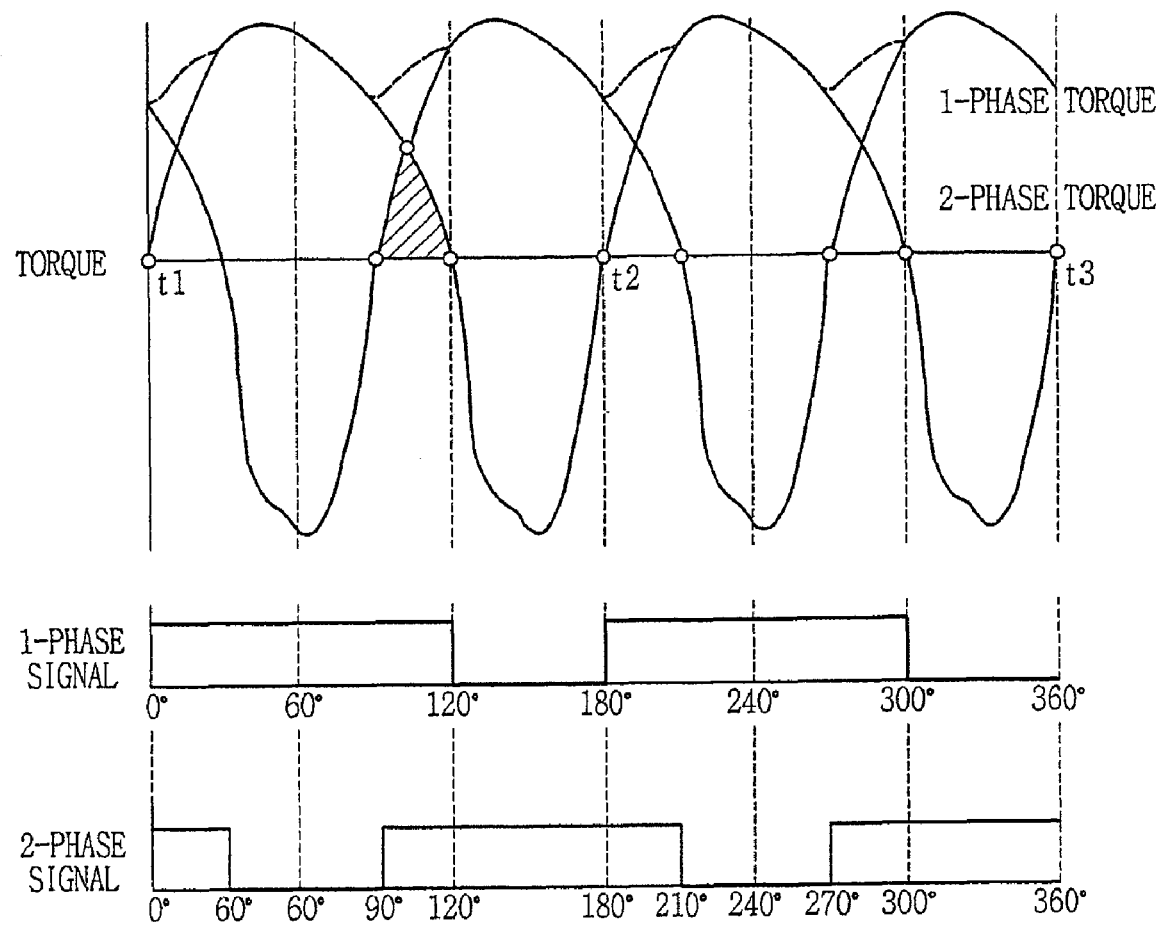
FIG. 6 is a curve showing a torque according to a driving method for the 2-phase SRM in accordance with the conventional art.
Figure 7:
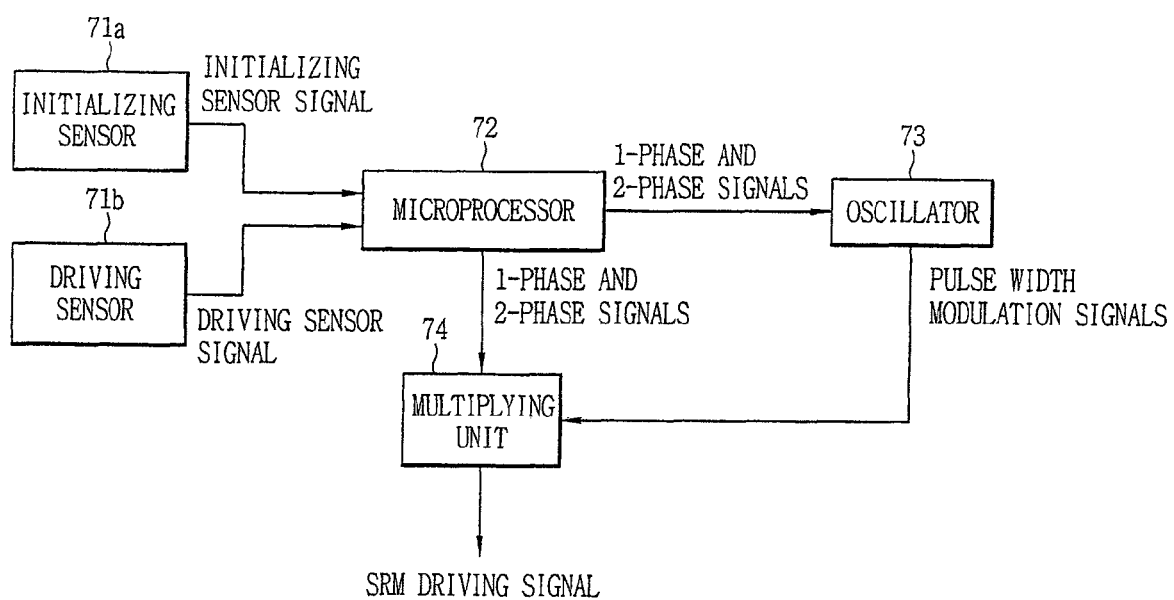
FIG. 7 is a block diagram showing a configuration of an apparatus for driving a 2-phase SRM according to the present invention.

FIG. 7 is a block diagram showing a configuration of an apparatus for driving a 2-phase SRM according to the present invention.

As shown, the apparatus for driving a 2-phase SRM according to the present invention comprises an initializing sensor 71a, a driving sensor 71b, a microprocessor 72, an oscillator 73 and a multiplying unit 74.

The initializing sensor 71a detects a position of a rotor of the 2-phase SRM at the time of an initial driving, and outputs an initializing sensor signal based on the detected result.

The driving sensor 71b detects a position of a rotor of the 2-phase SRM at the time of a normal driving, and outputs a driving sensor signal based on the detected result.

The microprocessor 72 generates 1-phase and 2-phase signals from the initializing sensor signal and the driving sensor signal outputted from the initializing sensor 71a and the driving sensor 71b.

When the 2-phase SRM has an rpm more than a preset rpm after being initially driven, the microprocessor 72 normally drives the 2-phase SRM.

The microprocessor 72 generates 1-phase and 2-phase signals based on the initializing sensor signal at the time of an initial driving, and generates 1-phase and 2-phase signals based on the driving sensor signal at the time of a normal driving.

The 2-phase signal has a phase different of 90° from the 1-phase signal.

The oscillator 73 generates pulse width modulation signals from the 1-phase and 2-phase signals generated from the microprocessor 72. Also, the multiplying unit 74 multiplies the 1-phase and 2-phase signals with the pulse width modulation signals, thereby generating signals for driving the SRM (an initializing signal and a driving signal).

The initializing sensor 71a is positioned so that the initializing sensor signals can be dwelled between a mis-aligned position and an aligned position of the 1-phase or 2-phase inductance profile.

The driving sensor 71b is positioned so that the driving sensor signal can be risen before the mis-aligned position of the 1-phase or 2-phase inductance profile.

Preferably, the driving sensor is positioned so that the driving sensor signal can be risen before the initializing sensor signal by 10°~30°.

The oscillator 73 generates a single pulse width modulation signal at the time of an initial driving, and generates first and second pulse width modulation signals at the time of a normal driving.

At the time of a normal mode of the SRM, dwell time of the first and second pulse width modulation signals can be varied according to a driving speed of the SRM, and can be risen after being delayed by a preset delay time.

The multiplying unit 74 may be implemented at the microprocessor 72 in a software manner or in a hardware manner.

Figure 8:
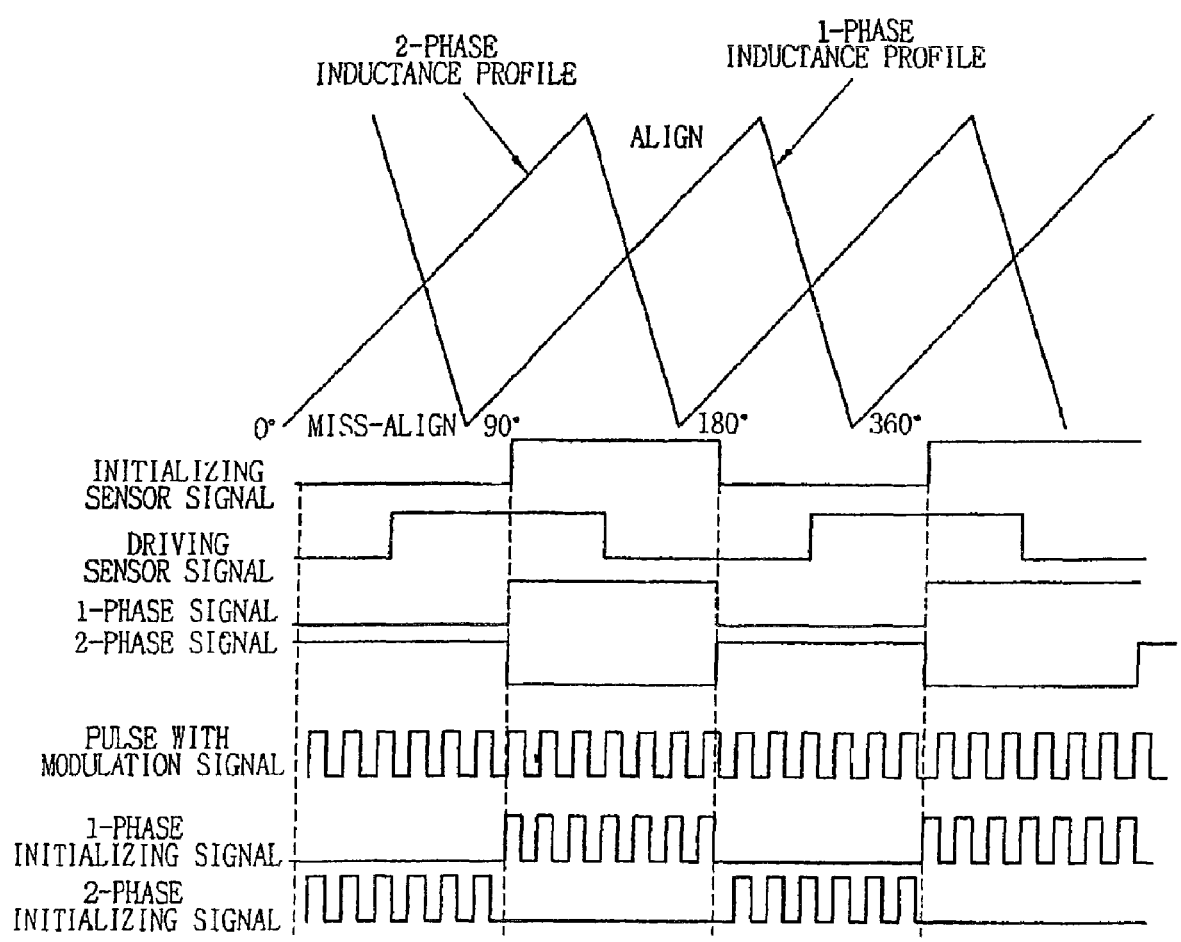
FIG. 8 is a waveform showing each portion of the apparatus for driving a 2-phase SRM at the time of an initial driving according to the present invention.

FIG. 8 is a waveform showing each portion of the apparatus for driving a 2-phase SRM at the time of an initial driving according to the present invention.

As shown, the initializing sensor is positioned on the shutter so that the initializing sensor signal can have a dwell time between a mis-aligned position and an aligned position of the 1-phase inductance profile so as to generate a maximum initializing torque.

The microprocessor generates a 1-phase signal based on the initializing sensor signal, generates a 2-phase signal having a phase difference of 90° from the 1-phase signal, and generates pulse width modulation (PWM) signals based on the 1-phase signal or the 2-phase signal.

The 1-phase signal, the 2-phase signal, and the pulse width modulation signal are multiplied with one another, thereby generating 1-phase and 2-phase driving signals.

Figure 9:
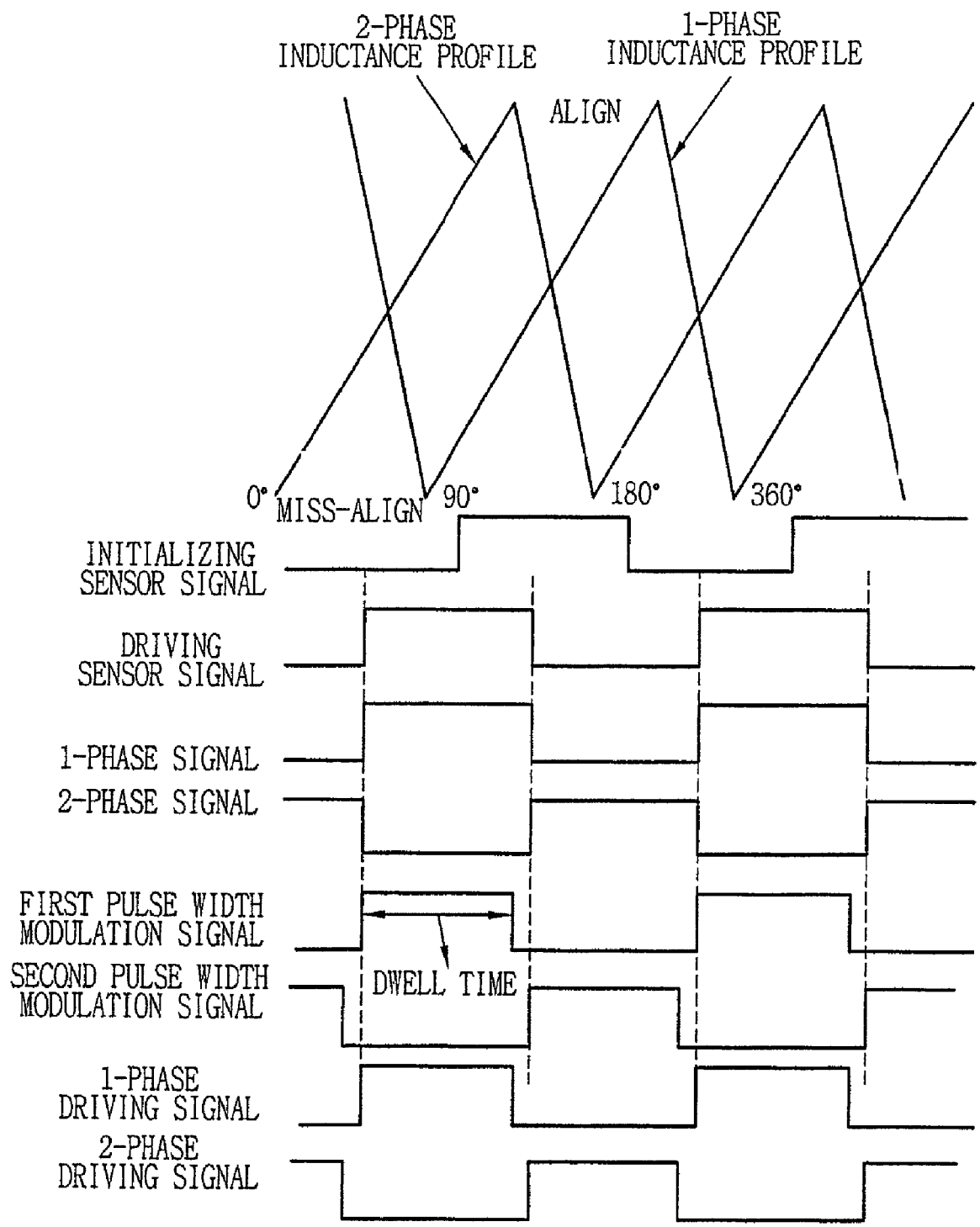
FIG. 9 is a waveform showing each portion of the apparatus for driving a 2-phase SRM at the time of a normal driving according to the present invention.

FIG. 9 is a waveform showing each portion of the apparatus for driving a 2-phase SRM at the time of a normal driving according to the present invention.

As shown, in order to provide a sufficient amount of currents to the SRM at the time of a torque occurrence time point (a mis-aligned time point of the 1-phase inductance profile), the driving sensor is positioned on the shutter so that the driving sensor signals can be risen before the mis-aligned position of the 1-phase inductance profile by a preset angle.

Preferably, the driving sensor signal is risen before the initializing sensor signal by 10°~30°.

The microprocessor generates a 1-phase signal based on the driving sensor signal, generates a 2-phase signal having a phase difference of 90° from the 1-phase signal, and generates first and second pulse width modulation (PWM) signals based on the 1-phase signal or the 2-phase signal.

In order to enhance a variable characteristic of the driving speed of the 2-phase SRM, each dwell time of the first and second pulse width modulation signals is variable and can be risen with a preset delay time.

Figure 10:
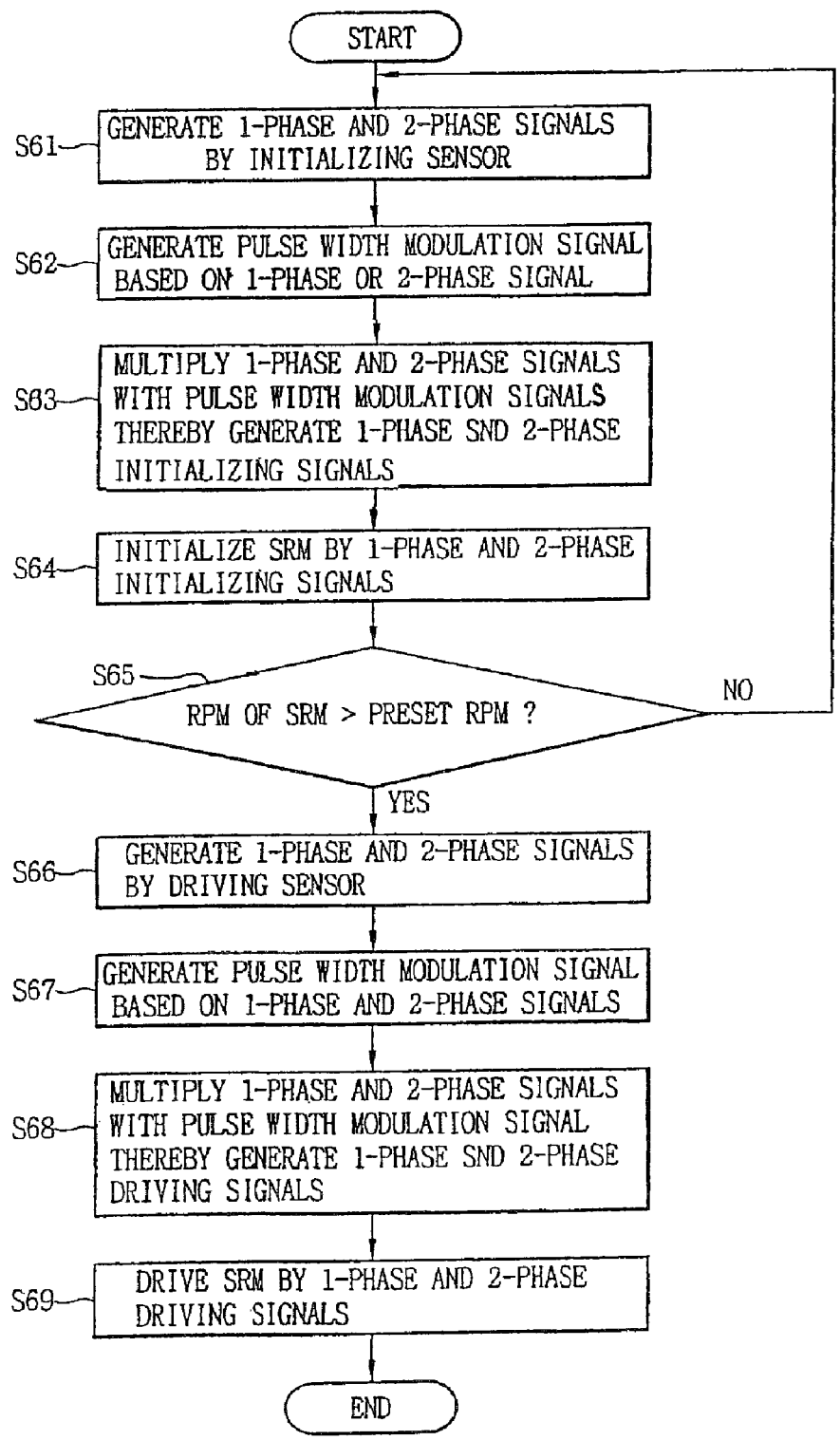
FIG. 10 is a flowchart showing a method for driving a 2-phase SRM according to the present invention.

FIG. 10 is a flowchart showing a method for driving a 2-phase SRM according to the present invention.

As shown, the method for driving a 2-phase SRM according to the present invention comprises generating 1-phase and 2-phase signals by using the initializing sensor 71a (S61), generating pulse width modulation signals based on the 1-phase or the 2-phase signal (S62), multiplying the 1-phase signal, the 2-phase signal, and the pulse width modulation signal thereby generating 1-phase and 2-phase initializing signals (S63), initializing the 2-phase SRM by the 1-phase and 2-phase initializing signals (S64), judging whether an rpm of the 2-phase SRM is more than a preset rpm after the SRM is initially driven (S65), if the rpm of the SRM is more than the preset rpm, generating 1-phase and 2-phase signals by the driving sensor 71b (S66), generating first and second pulse width modulation signals based on the 1-phase and 2-phase signals (S67), multiplying the 1-phase signal, the 2-phase signal, and the first and second pulse width modulation signals to one another thereby generating 1-phase and 2-phase driving signals (S68), and driving the SRM by the 1-phase and 2-phase driving signals (S69).

An operation of the apparatus and method for driving a 2-phase SRM according to the present invention will be explained.

At the time of an initial driving, the initializing sensor 71a detects a position of a rotor thus to generate an initializing sensor signal based on the detected result, thereby applying it to the microprocessor 72.

Then, the microprocessor 72 generates 1-phase and 2-phase signals based on the initializing sensor signal applied from the initializing sensor 71a (S61).

Then, the oscillator 73 generates first and second pulse width modulation signals based on the 1-phase and 2-phase signals (S62).

Then, the multiplying unit 74 multiplies the 1-phase and 2-phase signals outputted from the microprocessor 72 and the first and second pulse width modulation signals outputted from the oscillator 73 one another, thereby generating 1-phase and 2-phase initializing signals (S63).

The 2'-phase SRM is initially driven by 1-phase and 2-phase initializing signals (S64).

Then, the microprocessor 72 detects an rpm of the 2-phase SRM, and judges whether the detected rpm is more than a preset rpm (S65). If the rpm of the 2-phase SRM is more than the preset rpm, a position of the rotor is detected by the driving sensor 71*b* and 1-phase and 2-phase signals are generated based on the detected position of the rotor (S66).

Then, the oscillator 73 generates first and second pulse width modulation signals based on the 1-phase and 2-phase signals, respectively (S67).

Then, the multiplying unit 74 multiplies the 1-phase and 2-phase signals outputted from the microprocessor 72 and the first and second pulse width modulation signals outputted from the oscillator 73 one another, thereby generating 1-phase and 2-phase driving signals (S68).

The 2-phase SRM is driven by the 1-phase and 2-phase driving signals (S69).

In the present invention, 2-phase of the SRM is initially driven by detecting a position of the rotor by the initializing sensor at the time of an initial driving, and is normally driven by detecting a position of the rotor by the driving sensor at the time of a normal driving.

The apparatus and method for driving a 2-phase SRM according to the present invention has the following effects.

The initializing sensor initializes each phase of the 2-phase SRM (1-phase and 2-phase) at the time of an initial driving, and the driving sensor drives each phase of the 2-phase SRM at the time of a normal driving. Accordingly, a sufficient amount of torque is generated when the 2-phase SRM is driven at a high speed.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. An apparatus for driving a 2-phase SRM (switched reluctance motor), the apparatus comprising:
    an initializing sensor that detects each position of each phase of a 2-phase SRM, and generates an initializing sensor signal based on the detected result;
    a driving sensor that detects each position of each phase of the 2-phase SRM, and generates a driving sensor signal based on the detected result;
    an oscillator that generates pulse width modulation signals from 1-phase and 2-phase signals;
    a multiplying device that multiplies the 1-phase and 2-phase signals with first and second pulse width modulation signals, thereby generating 1-phase and 2-phase driving signals; and
    a microprocessor that initially drives the 2-phase SRM based on the initializing sensor signal at a time of an initial driving, and normally drives the 2-phase SRM based on the driving sensor signal at a time of a normal driving.

2. The apparatus of claim 1, wherein when an rpm of the 2-phase SRM is more than a preset rpm, the microprocessor converts a driving mode of the 2-phase SRM into a normal driving from an initial driving.

3. The apparatus of claim 1, wherein the microprocessor generates 1-phase and 2-phase signals based on the initializing sensor signal at the time of an initial driving.

4. The apparatus of claim 3, wherein the 2-phase signal has a phase difference of 90° from the 1-phase signal.

5. The apparatus of claim 1, wherein the microprocessor generates 1-phase and 2-phase signals based on the driving sensor signal at the time of a normal driving.

6. The apparatus of claim 5, wherein the 2-phase signal has a phase difference of 90° from the 1-phase signal.

7. The apparatus of claim 1, wherein the initializing sensor is positioned so that the initializing sensor signal is between a mis-aligned position and an aligned position of a 1-phase or 2-phase inductance profile.

8. The apparatus of claim 1, wherein the driving sensor is positioned so that the driving sensor signal rises before the mis-aligned position of the 1-phase or 2-phase inductance profile.

9. The apparatus of claim 8, wherein the driving sensor is positioned so that the driving sensor signal rises before the initializing sensor signal by 10°~30°.

10. The apparatus of claim 1, wherein each dwell time of the first and second pulse width modulation signals is variable according to a driving speed of the 2-phase SRM.

11. The apparatus of claim 1, wherein each dwell time of the first and second pulse width modulation signals rises after being delayed by a preset delay time.

12. The apparatus of claim 1, wherein the multiplying device is implemented at the microprocessor in software or hardware.

13. A method for driving a 2-phase SRM, the method comprising:
    detecting each position of each phase by an initializing sensor, and initializing the 2-phase SRM based on the detected result at a time of an initial driving; and
    detecting each position of each phase by a driving sensor, and normally driving the 2-phase SRM based on the detected result at a time of a normal driving, wherein the initializing the 2-phase SRM comprises:
        detecting each position of a rotor by the initializing sensor, and generating an initializing sensor signal based on the detected result;
        generating a 1-phase signal based on the initializing sensor signal, and generating a 2-phase signal having a phase different of 90° from the 1-phase signal;
        generating a pulse width modulation (PWM) signal based on the 1-phase or the 2-phase signal; and
        multiplying the 1-phase and 2-phase signals with the pulse width modulation signal, and thereby generating 1-phase and 2-phase initializing signals.

14. The method of claim 13, wherein the normally driving the 2-phase SRM comprises:
    detecting each position of a rotor by the driving sensor, and generating a driving sensor signal based on the detected result;
    generating a 1-phase signal based on the driving sensor signal, and generating a 2-phase signal by inverting the 1-phase signal;
    generating first and second pulse width modulation (PWM) signals based on the 1-phase or the 2-phase signal; and
    multiplying the 1-phase and 2-phase signals with the first and second pulse width modulation signals one another, and thereby generating 1-phase and 2-phase driving signals.

15. The method of claim 13, further comprising normally driving the 2-phase SRM when an rpm of the 2-phase SRM is more than a preset rpm after initially driving the 2-phase SRM.

16. An apparatus for driving a 2-phase SRM (switched reluctance motor), the apparatus comprising:
- an initializing sensor that detects each position of each phase of a 2-phase SRM, and generates an initializing sensor signal based on the detected result;
- a driving sensor that detects each position of each phase of the 2-phase SRM, and generates a driving sensor signal based on the detected result; and
- a microprocessor that initially drives the 2-phase SRM based on the initializing sensor signal at a time of an initial driving, and normally drives the 2-phase SRM based on the driving sensor signal at a time of a normal driving, wherein the initializing sensor is positioned so that the initializing sensor signal is between a mis-aligned position and an aligned position of a 1-phase or 2-phase inductance profile.

17. The apparatus of claim 16, wherein the driving sensor is positioned so that the driving sensor signal rises before the mis-aligned position of the 1-phase or 2-phase inductance profile.

18. The apparatus of claim 17, wherein the driving sensor is positioned so that the driving sensor signal rises before the initializing sensor signal by 10°~30°.

19. The apparatus of claim 16, wherein when an rpm of the 2-phase SRM is more than a preset rpm, the microprocessor converts a driving mode of the 2-phase SRM into a normal driving from an initial driving.

20. The apparatus of claim 16, wherein the microprocessor generates 1-phase and 2-phase signals based on the initializing sensor signal at the time of the initial driving and the driving sensor signal at the time of the normal driving, and wherein the 2-phase signal has a phase difference of 90° from the 1-phase signal.

* * * * *